US009086713B2

(12) United States Patent
Choi

(10) Patent No.: US 9,086,713 B2
(45) Date of Patent: Jul. 21, 2015

(54) INTERNAL VOLTAGE GENERATION CIRCUITS

(71) Applicant: SK hynix Inc., Icheon-si, Gyeonggi-do (KR)

(72) Inventor: Young Geun Choi, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 180 days.

(21) Appl. No.: 13/846,820

(22) Filed: Mar. 18, 2013

(65) Prior Publication Data

US 2014/0176101 A1 Jun. 26, 2014

(30) Foreign Application Priority Data

Dec. 20, 2012 (KR) ........................ 10-2012-0150095

(51) Int. Cl.
*H02M 3/157* (2006.01)
*G05F 1/56* (2006.01)

(52) U.S. Cl.
CPC ........................................ *G05F 1/56* (2013.01)

(58) Field of Classification Search
CPC ......... H02M 3/00; H02M 3/02; H02M 3/145; H02M 3/155; H02M 3/156; H02M 3/157
USPC .......... 323/265, 268, 273, 280, 282, 283, 351
See application file for complete search history.

(56) References Cited

U.S. PATENT DOCUMENTS

| | | | | |
|---|---|---|---|---|
| 7,277,315 | B2 * | 10/2007 | Yuan et al. | 365/149 |
| 7,969,797 | B2 * | 6/2011 | Kang | 365/189.09 |
| 8,030,989 | B2 * | 10/2011 | Song | 327/541 |
| 8,159,261 | B2 * | 4/2012 | Kim et al. | 326/30 |
| 8,194,476 | B2 * | 6/2012 | Kang | 365/189.09 |
| 2005/0017704 | A1 * | 1/2005 | Mo et al. | 323/313 |
| 2015/0035590 | A1 * | 2/2015 | Son | 327/540 |

FOREIGN PATENT DOCUMENTS

KR 1020110076137 A 7/2011

* cited by examiner

*Primary Examiner* — Adolf Berhane
(74) *Attorney, Agent, or Firm* — William Park & Associates Ltd.

(57) ABSTRACT

An internal voltage generation circuit utilizing dual comparison signal generators and dual drivers to drive the internal voltage to a selected level. The second driver is responsive to a control signal derived from both of the comparison signal generators. The internal voltage generation circuit overcomes a problem with prior art circuits that may not permit the internal voltage to be driven to the selected level over a range of power supply voltages.

20 Claims, 3 Drawing Sheets

INTERNAL VOLTAGE GENERATION CIRCUITS

CROSS-REFERENCES TO RELATED APPLICATIONS

The present application claims priority under 35 U.S.C 119(a) to Korean Application No. 10-2012-0150095, filed on Dec. 20, 2012, in the Korean Intellectual Property Office, which is incorporated herein by reference in its entirety as though fully set forth herein.

BACKGROUND

The present invention relates generally to semiconductor integrated circuits and, more particularly, to internal voltage generation circuits.

In general, a semiconductor memory device receives a power supply voltage VDD and a ground voltage VSS from an external device to generate internal voltages used in operation of internal circuits of the semiconductor memory device. The internal voltages for operating the internal circuits of the semiconductor memory device may include a core voltage VCORE supplied to a memory core region, a high voltage VPP used to drive or overdrive word lines or the like, and a back-bias voltage VBB applied to a bulk region (or a substrate) of NMOS transistors in the memory core region.

The core voltage VCORE may be a positive voltage which is less than the power supply voltage VDD supplied by the external device. Thus, the core voltage VCORE may be generated by reducing the power supply voltage VDD to a certain level. In contrast, the high voltage VPP may be greater than the power supply voltage VDD, and the back-bias voltage VBB may be a negative voltage which is less than the ground voltage VSS. Thus, charge pump circuits may be required to generate the high voltage VPP and the back-bias voltage VBB.

FIG. 1 is a circuit diagram illustrating a conventional internal voltage generation circuit of the prior art.

As illustrated in FIG. 1, the conventional internal voltage generation circuit is configured to include a comparator 1 and a driver 2.

The comparator 1 may compare a voltage level of a node ND10 between two resistors R1 and R2, which are serially connected to an output node having an internal voltage VINT, with a reference voltage VREF to generate a comparison signal COMP. The comparison signal COMP may be enabled to have a logic "low" level when the voltage level of the node ND10 is less than the reference voltage VREF.

The driver 2 may turn on a PMOS transistor P1 to pull up the internal voltage VINT to a power supply voltage VDD when the comparison signal COMP is enabled to have a logic "low" level. If the internal voltage VINT is pulled up, the level of the node ND10 may also be pulled up. Accordingly, the driver 2 may continuously pull up the internal voltage VINT until the level of the node ND10 is equal to the reference voltage VREF.

However, if the power supply voltage VDD applied to the driver 2 is less than a target level of the internal voltage VINT, it may be impossible to drive the internal voltage VINT to the target level over the power supply voltage VDD.

SUMMARY

In an embodiment, an internal voltage generation circuit includes a first internal voltage driver and a second internal voltage driver. The first internal voltage driver is configured to drive an internal voltage to a first power supply voltage when the internal voltage is less than a first target level, and the second internal voltage driver is configured to drive the internal voltage to a second power supply voltage when the internal voltage is greater than or equal to the first target level and is less than a second target level.

In accordance with another embodiment, an internal voltage generation circuit includes a first comparison signal generator configured to be driven by a first power supply voltage and configured to compare an internal voltage with a first reference voltage to generate a first comparison signal, a second comparison signal generator configured to be driven by a second power supply voltage and configured to compare the internal voltage with a second reference voltage to generate a second comparison signal, a first driver configured to be driven by the first power supply voltage and configured to drive the internal voltage in response to the first comparison signal, a pull-up signal generator configured to generate a pull-up signal enabled when both the first and second comparison signals are disabled, and a second driver configured to be driven by the second power supply voltage and configured to drive the internal voltage in response to the pull-up signal.

In accordance with another embodiment, An internal voltage generation circuit includes a first comparison signal generator that compares an internal voltage with a first reference voltage to generate a first comparison signal, a second comparison signal generator that compares the internal voltage with a second reference voltage to generate a second comparison signal, a first driver that drives the internal voltage in response to the first comparison signal and a second driver that drives the internal voltage in response to a control signal derived from the first and second comparison signals.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION

Hereinafter, embodiments in accordance with the present invention will be explained in more detail with reference to the accompanying drawings. Although the present invention is described with reference to a number of example embodiments thereof, it should be understood that numerous other modifications and variations may be devised by one skilled in the art that will fall within the spirit and scope of the invention.

Figure 1:
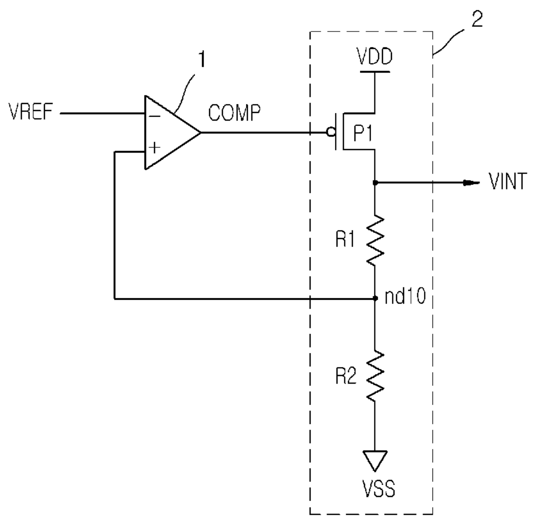
FIG. 1(PRIOR ART)
FIG. 1 is a circuit diagram illustrating a conventional internal voltage generation circuit of the prior art.
Figure 2:
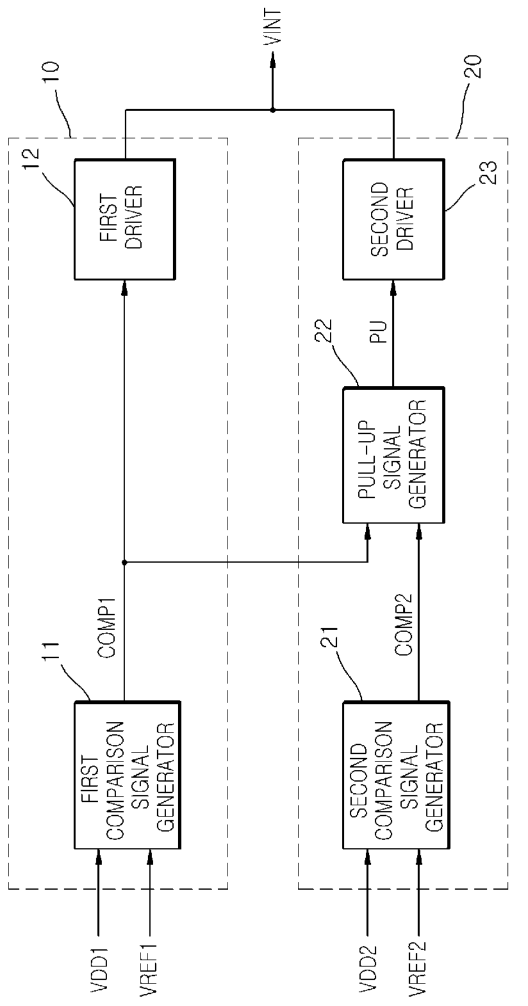
FIG. 2 is a block diagram illustrating a configuration of an internal voltage generation circuit in an embodiment in accordance with the present invention.

As illustrated in FIG. 2, the internal voltage generation circuit in an embodiment in accordance with the present invention may be configured to include a first internal voltage driver 10 and a second internal voltage driver 20. The first internal voltage driver 10 may drive an internal voltage VINT to a first power supply voltage VDD1 when the internal voltage VINT is less than a first target level. The second internal voltage driver 20 may drive the internal voltage VINT to a second power supply voltage VDD2 when the internal voltage VINT is greater than or equal to the first target level and is less than a second target level. The first power supply voltage VDD1 may be set to be greater than the second power supply voltage VDD2, and the first and second power supply voltages VDD1 and VDD2 may be supplied by an external device. Further, the first power supply voltage VDD1 may be greater than a target level of the internal voltage VINT.

The first target level may be set to drive the internal voltage VINT to the first power supply voltage VDD1, and the second target level may be set to drive the internal voltage VINT to the second power supply voltage VDD2. Detailed discussions of the first and second target levels will be provided subsequently.

Figure 3:
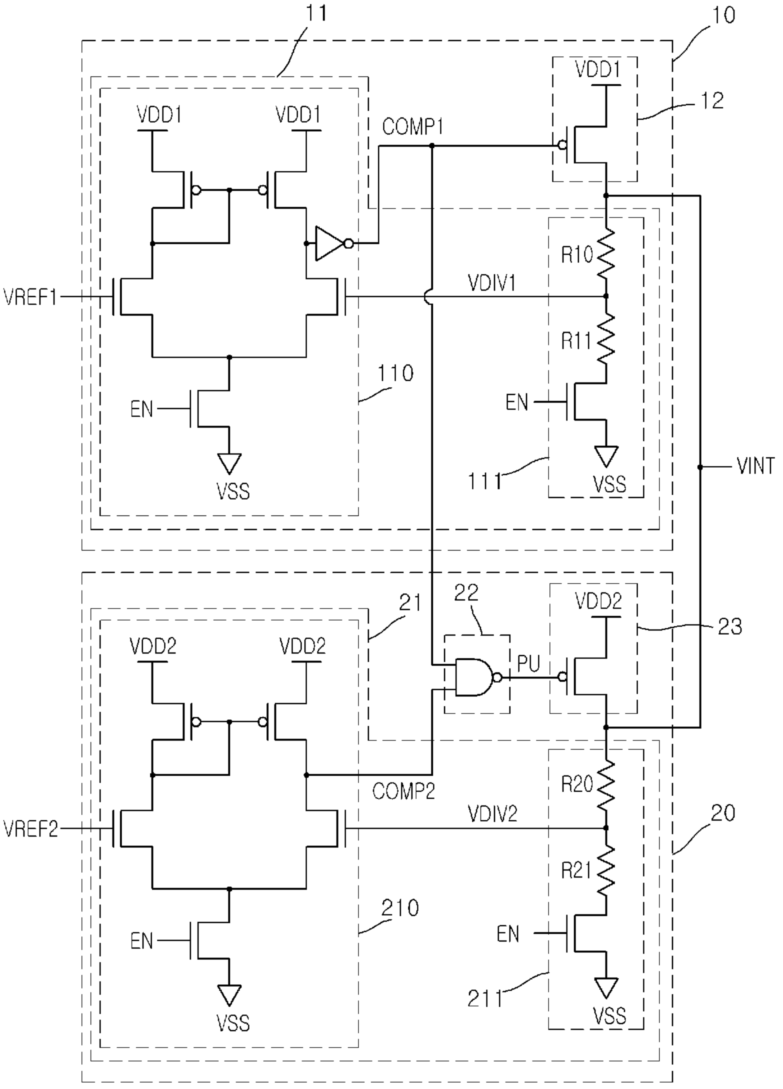
FIG. 3 is a circuit diagram of the internal voltage generation circuit illustrated in FIG. 1.

Configurations of the first and second internal voltage drivers 10 and 20 will be described more fully hereinafter with reference to FIGS. 2 and 3.

The first internal voltage driver 10 may be configured to include a first comparison signal generator 11 and a first driver 12.

The first comparison signal generator 11 may be driven by the first power supply voltage VDD1. The first comparison signal generator 11 may be configured to include a first comparator 110 (FIG. 3) that compares a first divided voltage VDIV1 with a first reference voltage VREF1 to generate a first comparison signal COMP1 when an enablement signal EN is enabled to have a logic "high" level, and a first voltage divider 111 that divides the internal voltage VINT using resistors R10 and R11, which are serially connected, to generate the first divided voltage VDIV1 when the enablement signal EN is enabled to have a logic "high" level.

That is, the first comparison signal generator 11 may generate the first comparison signal COMP1, enabled to have a logic "low" level, when the first divided voltage VDIV1 is less than the first reference voltage VREF1. The first comparison signal generator 11 may generate the first comparison signal COMP1, disabled to have a logic "high" level, when the first divided voltage VDIV1 is greater than or equal to the first reference voltage VREF1. In an embodiment, the resistors 10 and 11 may have the same resistance value, such that the first divided voltage VDIV1 is set to one-half of the internal voltage VINT. Further, the enablement signal EN may be enabled to have a logic "high" level for operation of the internal voltage generation circuit.

The first driver 12 may pull up the internal voltage VINT to the first power supply voltage VDD1 when the first comparison signal COMP1 is enabled to have a logic "low" level.

The second internal voltage driver 20 may be configured to include a second comparison signal generator 21, a pull-up signal generator 22 and a second driver 23.

The second comparison signal generator 21 may be driven by the second power supply voltage VDD2. The second comparison signal generator 21 may be configured to include a second comparator 210 (FIG. 3) that compares a second divided voltage VDIV2 with a second reference voltage VREF2 to generate a second comparison signal COMP2 when the enablement signal EN is enabled to have a logic "high" level, and a second voltage divider 211 that divides the internal voltage VINT using resistors R20 and R21, which are serially connected, to generate the second divided voltage VDIV2 when the enablement signal EN is enabled to have a logic "high" level. That is, the second comparison signal generator 21 may generate the second comparison signal COMP2, disabled to have a logic "high" level, when the second divided voltage VDIV2 is less than the second reference voltage VREF2. The second comparison signal generator 21 may generate the second comparison signal COMP2, enabled to have a logic "low" level, when the second divided voltage VDIV2 is greater than or equal to the second reference voltage VREF2. In an embodiment, the resistors 20 and 21 may have the same resistance value such that the second divided voltage VDIV2 is set to one-half of the internal voltage VINT. Further, the second reference voltage VREF2 may be set to be greater than the first reference voltage VREF1.

The pull-up signal generator 22 may generate a pull-up signal PU which is enabled to have a logic "low" level when both the first and second comparison signals COMP1 and COMP2 are disabled to have a logic "high" level.

The second driver 23 may pull up the internal voltage VINT to the second power supply voltage VDD2 when the pull-up signal PU is enabled to have a logic "low" level.

The first and second target levels are discussed in detail in the following paragraphs.

The first target level may be a level for driving the internal voltage VINT to the first power supply voltage VDD1 when the first and second divided voltages VDIV1 and VDIV2 (having a level substantially equal to one-half of the internal voltage VINT) are generated to have a level less than the first reference voltage VREF1. Thus, the first target level may be set to have a level which is twice that of the first reference voltage VREF1.

The second target level may be a level for driving the internal voltage VINT to the second power supply voltage VDD2 when the first and second divided voltages VDIV1 and VDIV2 (having a level substantially equal to one-half of the internal voltage VINT) are generated to have a lower level than the second reference voltage VREF2. Thus, the second target level may be set to have a level which is twice that of the second reference voltage VREF2.

Hereinafter, operation of the internal voltage generation circuit as set forth above will be described in conjunction with an example wherein the second power supply voltage VDD2 is less than a target level of the internal voltage VINT and the internal voltage VINT is less than the first target level.

The first voltage divider 111 (FIG. 3) of the first comparison signal generator 11 may generate the first divided voltage VDIV1, having a level less than the first reference voltage VREF1, when the internal voltage VINT is less than the first target level. The second voltage divider 211 of the second comparison signal generator 21 may generate the second divided voltage VDIV2, having a level less than the second reference voltage VREF2, when the internal voltage VINT is less than the first target level.

The first comparator 110 of the first comparison signal generator 11 may compare the first divided voltage VDIV1, less than the first reference voltage VREF1, with the first reference voltage VREF1 to generate the first comparison signal COMP1 having a logic "low" level. The second comparator 210 of the second comparison signal generator 21 may compare the second divided voltage VDIV2, less than the second reference voltage VREF2, with the second reference voltage VREF2 to generate the second comparison signal COMP2 having a logic "high" level.

The pull-up signal generator 22 may execute a NAND operation of the first comparison signal COMP1 having a logic "low" level and the second comparison signal COMP2 having a logic "high" level to generate the pull-up signal PU having a logic "high" level.

The first driver 12 may receive the first comparison signal COMP1, having a logic "low" level, to drive the internal voltage VINT to the first power supply voltage VDD1. The second driver 23 may receive the pull-up signal PU, having a logic "high" level, such as not to drive the internal voltage VINT to the second power supply voltage VDD2. That is, the first driver 12 may drive the internal voltage VINT to the first power supply voltage VDD1 until the internal voltage VINT is generated to have the first target level.

As described above, the internal voltage generation circuit according to an embodiment may drive the internal voltage VINT to the first power supply voltage VDD1, having a level greater than the second power supply voltage VDD2, to converge the internal voltage VINT to the target level when the second power supply voltage VDD2 is less than the target level of the internal voltage VINT.

Hereinafter, an operation of the internal voltage generation circuit as set forth above will be described in conjunction with an example wherein the second power supply voltage VDD2 is greater than a target level of the internal voltage VINT, and the internal voltage VINT is greater than or equal to the first target level and is less than the second target level.

The first voltage divider 111 (FIG. 3) of the first comparison signal generator 11 may generate the first divided voltage VDIV1, having a level greater than the first reference voltage VREF1, and having a level less than the second reference voltage VREF2, when the internal voltage VINT is greater than or equal to the first target level, and is less than the second target level. The second voltage divider 211 of the second comparison signal generator 21 may generate the second divided voltage VDIV2, having a level greater than the first reference voltage VREF1, and having a level less than the second reference voltage VREF2, when the internal voltage VINT is greater than or equal to the first target level, and is less than the second target level.

The first comparator 110 of the first comparison signal generator 11 may compare the first divided voltage VDIV1, greater than the first reference voltage VREF1, with the first reference voltage VREF1, to generate the first comparison signal COMP1 having a logic "high" level. The second comparator 210 of the second comparison signal generator 21 may compare the second divided voltage VDIV2, less than the second reference voltage VREF2, with the second reference voltage VREF2, to generate the second comparison signal COMP2 having a logic "high" level.

The pull-up signal generator 22 may execute a NAND operation of the first comparison signal COMP1 having a logic "high" level and the second comparison signal COMP2 having a logic "high" level to generate the pull-up signal PU having a logic "low" level.

The first driver 12 may receive the first comparison signal COMP1, having a logic "high" level, such as not to drive the internal voltage VINT any more. The second driver 23 may receive the pull-up signal PU, having a logic "low" level, to drive the internal voltage VINT to the second power supply voltage VDD2. That is, the second driver 23 may drive the internal voltage VINT to the second power supply voltage VDD2 until the internal voltage VINT is generated to have the second target level.

As described above, the internal voltage generation circuit in an embodiment in accordance with the present invention may drive the internal voltage VINT to the second power supply voltage VDD2 to converge the internal voltage VINT to the target level when the second power supply voltage VDD2 is greater than the target level of the internal voltage VINT.

While certain embodiments have been described above, it will be understood by those skilled in the art that the embodiments described are by way of example only. Accordingly, the internal voltage generation circuits described herein should not be limited based on the described embodiments. Rather, the internal voltage generation circuits described herein should only be limited in light of the claims that follow, when taken in conjunction with the above description and accompanying drawings.

What is claimed is:

1. An internal voltage generation circuit, the circuit comprising:

a first internal voltage driver configured to be driven by a first power supply voltage and configured to drive an internal voltage to the first power supply voltage when the internal voltage is less than a first target level; and a second internal voltage driver configured to be driven by a second power supply voltage and configured to drive the internal voltage to the second power supply voltage when the internal voltage is greater than or equal to the first target level and is less than a second target level, wherein the second internal voltage driver includes:

a second comparison signal generator configured to be driven by the second power supply voltage and configured to compare the internal voltage with a second reference voltage to generate a second comparison signal;

a pull-up signal generator configured to generate a pull-up signal enabled when both the first and second comparison signals are disabled; and a second driver configured to be driven by the second power supply voltage and configured to drive the internal voltage in response to the pull-up signal.

2. The circuit of claim 1, wherein the first power supply voltage is set to have a level greater than the second power supply voltage, and the first and second power supply voltages are supplied by an external device.

3. The circuit of claim 1, wherein the internal voltage is not driven when the internal voltage is greater than the second target level.

4. The circuit of claim 1, wherein the first internal voltage driver includes:

a first comparison signal generator configured to be driven by the first power supply voltage and configured to compare the internal voltage with a first reference voltage to generate a first comparison signal; and a first driver configured to be driven by the first power supply voltage and configured to drive the internal voltage in response to the first comparison signal.

5. The circuit of claim 4, wherein the first comparison signal generator includes:

a first comparator configured to be driven by the first power supply voltage and configured to compare a first divided voltage with the first reference voltage in response to an enablement signal to generate the first comparison signal; and a first voltage divider configured to divide the internal voltage in response to the enablement signal to generate the first divided voltage.

6. The circuit of claim 5, wherein the first comparison signal is enabled when the first divided voltage is less than the first reference voltage.

7. The circuit of claim 6, wherein the first driver pulls up the internal voltage when the first comparison signal is enabled.

8. The circuit of claim 1, wherein the second comparison signal generator includes: a second comparator configured to be driven by the second power supply voltage and configured to compare a second divided voltage with the second reference voltage in response to an enablement signal to generate the second comparison signal;

and a second voltage divider configured to divide the internal voltage in response to the enablement signal to generate the second divided voltage.

9. The circuit of claim 8, wherein the second comparison signal is enabled when the second divided voltage is greater than or equal to the second reference voltage.

10. The circuit of claim 9, wherein the second driver pulls up the internal voltage when the pull-up signal is enabled.

11. The circuit of claim 1, wherein the first reference voltage is set to have a level less than the second reference voltage.

12. The circuit of claim 11, wherein the first target level is set to have a level which is twice that of the first reference voltage.

13. The circuit of claim 11, wherein the second target level is set to have a level which is twice that of the second reference voltage.

14. An internal voltage generation circuit comprising:

a first comparison signal generator that compares an internal voltage with a first reference voltage to generate a first comparison signal;

a second comparison signal generator that compares the internal voltage with a second reference voltage to generate a second comparison signal;

a first driver that drives the internal voltage in response to the first comparison signal;

a pull-up signal generator configured to generate a pull-up signal enabled when both the first and second comparison signals are disabled; and a second driver that drives the internal voltage in response to the pull-up signal.

15. The internal voltage generation circuit of claim 14, wherein the first comparison signal generator and the first driver are configured to be driven by a first power supply voltage.

16. The internal voltage generation circuit of claim 15, wherein the second comparison signal generator and the second driver are configured to be driven by a second power supply voltage.

17. The internal voltage generation circuit of claim 16, wherein the first power supply voltage is set to have a level greater than the second power supply voltage, and the first and second power supply voltages are supplied by an external device.

18. The internal voltage generation circuit of claim 17, wherein the internal voltage is driven to the first power supply voltage when the internal voltage is less than a first target level.

19. The internal voltage generation circuit of claim 18, wherein the internal voltage is driven to the second power supply voltage when the internal voltage is greater than or equal to the first target level and is less than a second target level.

20. The internal voltage generation circuit of claim 19, wherein the internal voltage is not driven when the internal voltage is greater than the second target level.

* * * * *